(12) United States Patent
Breuer et al.

(10) Patent No.: US 8,825,009 B2
(45) Date of Patent: Sep. 2, 2014

(54) SIM INFORMATION BASED SIM VALIDATION

(75) Inventors: Volker Breuer, Bötzlow (DE); Lars Wehmeier, Falkensee (DE)

(73) Assignee: Gemalto M2M GmbH, Munich (DE)

(*) Notice: Subject to any disclaimer, the term of this patent is extended or adjusted under 35 U.S.C. 154(b) by 250 days.

(21) Appl. No.: 13/490,775

(22) Filed: Jun. 7, 2012

(65) Prior Publication Data

US 2012/0315875 A1 Dec. 13, 2012

(30) Foreign Application Priority Data

Jun. 8, 2011 (EP) .................................. 11169150

(51) Int. Cl.
*H04M 1/66* (2006.01)
*H04W 12/06* (2009.01)
*H04L 29/06* (2006.01)
*H04W 8/18* (2009.01)

(52) U.S. Cl.
CPC .............. *H04W 12/06* (2013.01); *H04W 8/183* (2013.01); *H04L 63/108* (2013.01)
USPC ........... 455/411; 455/410; 455/558; 455/418; 455/550.1

(58) Field of Classification Search
USPC .............. 455/410–411, 418–420, 558, 550.1, 455/41.2
See application file for complete search history.

(56) References Cited

U.S. PATENT DOCUMENTS

| | | | | |
|---|---|---|---|---|
| 5,455,863 A | * | 10/1995 | Brown et al. ................. | 380/247 |
| 5,661,806 A | * | 8/1997 | Nevoux et al. ............... | 380/247 |
| 6,199,161 B1 | * | 3/2001 | Ahvenainen .................. | 713/155 |
| 6,741,852 B1 | * | 5/2004 | Mohrs .......................... | 455/411 |
| 7,280,847 B2 | * | 10/2007 | Goldthwaite et al. ........ | 455/558 |
| 7,539,514 B2 | * | 5/2009 | Shieh et al. .................... | 455/558 |
| 8,095,184 B2 | * | 1/2012 | Hiltunen et al. .............. | 455/558 |
| 8,195,235 B2 | * | 6/2012 | Montes ......................... | 455/558 |
| 8,291,077 B2 | * | 10/2012 | I'Anson ........................ | 709/225 |
| 8,509,767 B2 | * | 8/2013 | Parsons et al. ................ | 455/434 |
| 8,644,825 B2 | * | 2/2014 | Montes et al. ............. | 455/435.2 |
| 2009/0054104 A1 | * | 2/2009 | Borean et al. ................. | 455/558 |
| 2009/0082001 A1 | * | 3/2009 | Rahul et al. ................... | 455/418 |
| 2009/0156254 A1 | * | 6/2009 | Montes ......................... | 455/558 |
| 2013/0217359 A1 | * | 8/2013 | Cherian et al. ............... | 455/411 |

* cited by examiner

*Primary Examiner* — Sharad Rampuria
(74) *Attorney, Agent, or Firm* — Ware, Fressola, Maguire & Barber LLP (57) ABSTRACT

The present invention relates to a method for operating a RF communication device, a RF communication device (400), a method for operating an authentication server of a network entity and to corresponding computer programs. All aspects of the present invention take into account that a continuous operation of a RF communication device, in particular of a metering application, needs to be ensured, even if the function of a component SIM or initial SIM (410) has to be replaced or supplemented by an external new SIM (420). It is suggested to ascertain the validity of the external SIM by using information stored in the component/initial SIM. The validity of the external SIM can be ascertaining either solely on the side of the RF communication device or by sending a corresponding validity check request signal to a remote network entity.

15 Claims, 4 Drawing Sheets

SIM INFORMATION BASED SIM VALIDATION

CROSS REFERENCE TO RELATED APPLICATION

This application claims priority under 35 U.S.C. §119 to European Patent Application No. 11 169 150.7 filed Jun. 8, 2011, which application is hereby incorporated by reference.

TECHNICAL FIELD

The present invention relates to a method for operating a Radio Frequency (RF) communication device, to a RF communication device, to a method for operating an authentication server of a network entity of a RF communication network and corresponding computer programs. In particular, the present invention relates to validating a connectable authentication module, such as a removable SIM or a virtual authentication module with corresponding functionality, by using information of a component/initial authentication module.

BACKGROUND OF THE INVENTION

A subscriber authentication module or a subscriber identification/identity module (SIM) stores subscriber information, such as the service-subscriber key (IMSI), to identify a subscriber on a mobile terminal, such as a mobile phone or a metering application. Use of SIM cards is usually mandatory for participating in mobile communication networks, such as a second generation (2G) or third generation (3G) network, through a mobile terminal.

The equivalent of a SIM in UMTS is called the Universal Integrated Circuit Card (UICC), which usually runs a Universal Subscriber Identity Module (USIM) application. Another equivalent is the Removable User Identity Module (R-UIM) that is more often used in Code Division Multiple Access—(CDMA)-based devices. For covering all sorts of subscriber identification/authentication modules, the terms "authentication module" or "SIM" are used in the following.

When a mobile terminal starts up, it obtains the international mobile subscriber identity (IMSI) from the authentication module and passes this identity to a mobile operator/to a network entity of a communication network, requesting access and authentication. The mobile terminal may have to pass a PIN to the authentication module before the authentication module will reveal this identity. The mobile operator/network entity checks the request and a complex authentication process begins. In the outcome, if the authentication process succeeds, the mobile terminal is assigned an authentication key by the mobile operator, which allows the mobile terminal to encrypt all further communication between the mobile terminal and the communication network.

The specification of U.S. Pat. No. 6,741,852 B1 describes a method and a device to authenticate subscribers in a mobile radiotelephone system. It is described that the subscriber firstly initializes an authentication entity by executing several times an authentication algorithm involving stored subscriber-specific data components and by storing the corresponding response parameters of the subscribers-specific data components in a memory. A systematic authentication of the subscriber is made possible by the authentication parameters stored in the memory since the authentication entity can always refer back to the response parameters of the individual subscriber module it already knows.

A change or a replacement of an authentication module within a mobile terminal involves some technical challenges, in particular with respect to the authentication process, if operation of the mobile terminal is not to be interrupted.

SUMMARY OF THE INVENTION

It is a technical object of the present invention to provide a method for operating a RF communication device, wherein replacement of an authentication module of the RF communication device is facilitated. It is also a technical object of the present invention to provide a corresponding RF communication device. It is furthermore a technical object of the present invention to provide a method for operating an authentication server of a network entity of a RF communication network, wherein this operating method allows for a facilitated a replacement of an authentication module of a RF communication device participating in the RF communication network. It is also regarded as being an object of the present invention to provide corresponding computer programs.

According to a first aspect of the present invention, the above identified object is achieved by a method for operating a RF communication device, the method comprising:
  operating the RF communication device using a first authentication module, which comprises a first processor and a first memory storing first subscriber information suitable for authenticating and identifying a first subscriber on a first RF communication network,
  detecting an operative connection of the RF communication device to a connectable second authentication module, which comprises a second memory storing second subscriber information suitable for authenticating and identifying either the first or the second subscriber on either the first RF communication network or on a second RF communication network,
  reading the second subscriber information from the second authentication module,
  ascertaining whether the second subscriber information fulfills a predetermined validity criterion and
  if the validity criterion is fulfilled by the second subscriber information, operating the RF communication device using the second authentication module either in addition to using the first authentication module or without using the first authentication module.

The present invention includes the recognition that in some cases it is required to be ensured that an external authentication module can be used to replace at least partially the functionality of an inserted authentication module. There is a plurality of reasons for such necessity. To give an example, in a metering application that measures for instance a gas, water, electricity or data volume consumption at a customer's or subscriber's site and transmits consumption values to a provider, such replacement can be necessary due to a change of the respective provider. A new authentication module fitting to a new provider usually needs to fulfil some criteria to be accepted as a valid replacement.

The invention recognizes that information necessary for the validation check can not be stored in advance, as a new provider may not be known at the time of a set-up/distribution of the metering device comprising the RF communication device. However, continuous operation of the RF communication device, in particular of a metering application, has to be ensured. An exchange of the metering device or the RF communication device upon a change of a provider appears as a waste of resources and involves considerable cost.

According to the method of the first aspect of the present invention, the RF communication device is operated such that it checks the validity of the second authentication module (the connectable authentication module) by checking a predetermined validity criterion with respect to the second subscriber information stored on the second authentication module. Therefore, a validation of the second authentication module can be implemented with support of information stored in the first authentication module.

A replacement of the role of the first authentication module in the exchange with the RF communication network by the second authentication module therefore does not cause any disturbances in the operation of the RF communication device, and in particular does not require a physical replacement of the first authentication module.

A manual change of an authentication module usually involves turning off the RF communication device and turning it on after a replacement authentication module has been installed. In contrast, the RF communication device that is operated according to the method of the first aspect of the invention is not significantly disturbed in its designated operation, as the newly operatively connected second authentication module can be validated during the designated operation of the RF communication device. If the validity criterion is fulfilled by the second subscriber information stored in the second memory of the second authentication module, the designated operation can continue using the second authentication module. After an operative connection has been established, a change from the first authentication module to the second authentication module or, respectively, the additionally use of the second authentication module can be implemented, for instance, by software means and therefore very quickly. In the particular application example of a gas metering application, gas consumption and gas metering can continue even if the provider has changed, that is, avoiding the physical replacement of the first authentication module by the second authentication module is necessary.

The invention facilitates the implementation of new business opportunities involving for instance a temporary change of a provider for a limited amount of time or amount of gas/water/electricity/data volume (in the following also referred to as goods) on the basis of temporary special rates. Within the scope of the present description, the wording provider refers to a supplier of goods, for instance gas/water/electricity/data volume etc., wherein a customer of a provider authenticates himself by means of the first authentication module and/or the second authentication module.

If the validity criterion is fulfilled by the second subscriber information, the RF communication device can also be operated such that the first processor of the first authentication module and the second subscriber information stored in the second memory of the second authentication module are used.

In the outcome, continuous operation of the RF communication device can be ensured, even and in particular, if the role of the first authentication module in the communication with the RF communication network is at least partially to be replaced by the second authentication module.

It shall be understood that the term "replacement" is not necessarily to be understood literally. The technical function of the first authentication module, in some specific context also referred to as the "role" of the first authentication model, can be replaced by the second authentication module, or it can be supplemented by the second authentication module.

According to embodiments of the present invention, the RF communication device has at least one RF communication unit, which is configured to perform RF communication with external RF communication devices using any RF communication protocol. Operating the RF communication device thus implies, for such embodiments, that the RF communication device performs RF communication by operating its RF communication unit.

The first and the second authentication module can be a SIM card, an UICC, a R-UIM or any other kind of an authentication module. The first authentication module can either be a removable authentication module like a SIM card, but also and in particular a component SIM (CSIM), whose processor and memory is constantly installed in the RF communication device and which can exhibit a specific geometrical configuration. The first authentication module can also be an initial authentication module, in particular an initial SIM that originally has been installed in the RF communication device. The RF communication device can be of any kind.

The operative connection of the RF communication device to the connectable second authentication module can be realized by a physical contact, in particular through conduction lines. For instance, the RF communication device comprises an additional slot that allows for insertion of the second authentication module. The operative connection can be any kind of a connection that allows reading of information stored on the connectable second authentication module, such as a software based connection or a remote connection.

The connectable second authentication module can thus be a corporeal authentication module, such as a SIM, that can be connected to the RF communication device manually or automatically, e.g., through a physical connection. Such removable corporeal second authentication module can also comprise a second processor.

As an alternative embodiment to a corporeal authentication module, the connectable second authentication module can be implemented virtually. Unlike a SIM, a virtual authentication module is not corporeally present as a separate physical entity in the RF communication device. A virtual authentication module may take the form of a software-implemented module that is executable on the RF communication device or on a server of a local or wide area network that the RF communication device can connected to through a wireless or wired network connection.

For instance, the second memory storing the second subscriber information may technically be realized by defining certain data fields with the second subscriber information in a server of a network that can be accessed and read by the RF communication device through a remote connection channel. As a consequence, a customer can be enabled to change his/her provider (of gas/water/electricity/internet access/mobile communication network access or the like) directly via a data exchange channel. Taking the example of an internet connection, the costumer may be authorized to define the second subscriber information through a web-portal of a respective provider. In the outcome, the above-mentioned steps of reading and ascertaining, or in other words: the authentication of the second authentication module, can be performed via the wireless or wired network connection to the virtual second authentication module.

In particular, the first and the second subscriber information can both relate to the same user of the RF communication device.

In the following, some embodiments of carrying out the method of the first aspect of the present invention are described. The additional features elucidated in the context of different embodiments can be combined with each other to form further embodiments of the method of the first aspect of the present invention, as long as they are not explicitly described as forming mutually exclusive alternatives to each other.

In the following, standard abbreviations, wordings and terms that are commonly used for describing second generation (2G) or third generation (3G) RF communication systems are also used for describing the present invention. It shall be understood, however, that a single term used in the present description and in the claims shall not be construed in a sense that would reduce the applicability of the present invention to a certain mobile communication standard. For instance, the RF communication device can be a so called "User Equipment" that is adapted to participate in a mobile communication network. Such mobile communication network can be a 2G, 2.5G, 3G, LTE or any other mobile communication network, even though that specific term "User Equipment" is more common when speaking of a UMTS communication network. A first RF communication network or a second RF communication network mentioned herein can thus be any communication network enabling mobile communication via a radio access network. The applicability of the present invention is not only reduced to methods, devices and computer programs implemented/forming or participating in a wide-area-mobile communication network, such as GSM, UMTS or LTE, but the invention can also be applied in a local mobile communication network like PICOCELL, WLAN, WPAN, WiFi or similar networks.

In a preferred embodiment, the step of ascertaining whether the second subscriber information stored on the second authentication module fulfills the predetermined validity criterion is performed by executing, either on the first processor or on a third processor arranged in the RF communication device, a first executable code.

For instance, executing the first executable code can comprise decrypting encrypted second subscriber information by using information necessary for said decrypting stored on the first memory of the first authentication device.

In an example of a customer wanting to change from a current provider to a new provider, the first memory stores information related to a current provider and to a current contract number and the second memory stores information related to a new provider and to a new contract number. However, the costumer and/or location relevant information, such as name and address, should not change and executing the first executable code can comprise checking whether this costumer and/or location relevant information is indeed identical for both the first and the second authentication module.

The first authentication module can be incorporated in a metering apparatus and may contain customer and/or location relevant information, e.g., contract information. This information may be stored and encrypted by the second authentication module with or by use of information of the first authentication module or stored in the application being connected with the authentication module.

It is furthermore preferred that the step of ascertaining whether the second subscriber information stored on the second authentication module fulfills the predetermined validity criterion, comprises:
  comparing a first predetermined part of the first subscriber information stored on the first subscriber authentication module with a second predetermined part of the second subscriber information read from the second authentication module.

Comparing can be any form of a mathematical operation for ascertaining the validity. In particular, the second subscriber information fulfills the predetermined validity criterion, if the first predetermined part is identical to the second predetermined part.

For instance, the first predetermined part of the first subscriber information comprises first costumer and/or location relevant information, such as a first name and a first address, and the second predetermined part of the second subscriber information comprises second costumer and/or location relevant information, such as a second name and a second address. In the case of a provider change, the validity criterion could be fulfilled, if the first name corresponds to the second name and the first address corresponds to the second address. However, it is also possible the only the address needs to be the same for both authentication modules, for instance, if there is a tenant change and the provider remains the same.

In another preferred embodiment, the step of ascertaining whether the information stored on the second authentication module fulfills a predetermined validity criterion is performed by
  sending a request for checking fulfillment of the validity criterion via the first RF communication network to a remote network entity, the request including the first subscriber information and the second subscriber information read from the second authentication module and
  receiving a response from the remote network entity including information on fulfillment of the validity criterion from the remote network entity.

Within this embodiment of the method of the first aspect of the present invention, the step of ascertaining the validity is implemented with support of the remote network entity. The remote network entity thus stores authentication information, for instance in an authentication memory of an authentication server. After reception of the request sent by the RF communication device, the network entity ascertains whether the second subscriber information complies with the stored authentication information and causes transmission of the response signal to the RF communication device. This response is received and based on this response, it is ascertained in the RF communication device, whether the second authentication module can be used by the RF communication device.

The step of ascertaining whether the second subscriber information stored on the second authentication module fulfills the predetermined validity criterion can also comprise:
  identifying a validity information element stored in the second memory of the second authentication module.

Such validity information element can be, for instance, the name of the subscriber, a contract number, an address of the subscriber, a serial number of the RF communication device.

The reading of the second subscriber information stored on the second authentication module can be performed either by the third processor of the RF communication device or by the first processor of the first authentication module, executing a second executable code. The third processor and/or the first processor are/is therefore operatively connected to the second authentication module, once the operative connection between the RF communication device and the connectable second authentication module has been established and detected. Such operative connection can be realized by electronic conduction lines or by a remote connection.

In yet a further preferred embodiment, operating the RF communication device using the second authentication module is performed with a time limit, wherein the first authentication module is used again after the time limit has elapsed. For instance, once the first and the second authentication modules can be used by the RF communication device, either the first or the second authentication module can be defined as the master authentication module whose subscriber information is used and it can be switched to the other authentication module after the time limit has elapsed, the other authentication module then becoming the new master authentication module. The switching between the first and the second authentication module can thus depend on the time limit.

It is appropriate that, if the validity criterion is not fulfilled by the second subscriber information, the operation of the RF communication device is continued using the first authentication module. Such non-fulfillment can be signalized to a user and/or to the remote network entity.

Thus, in a preferred embodiment, the method additionally comprises, if the validity criterion is not fulfilled by the second subscriber information:

sending a message to the remote network entity, the message including information about invalidity of the second subscriber information according to the predetermined validity criterion.

Therefore, in case of a detection of an invalid authentication module, the first authentication module stays in place and it is indicated that an invalid or an unregistered authentication module is operatively connected to the RF communication device, in particular: inserted in the RF communication device. Such indication can happen both on the side of the communication network and on the side of the user/consumer.

Accordingly, in a preferred embodiment, if the validity criterion is not fulfilled by the second subscriber information, the method comprises:

Generating, at a user interface of the RF communication device, an output indicating invalidity of the second subscriber information according to the predetermined validity criterion.

If operation of RF communication device using the second authentication module begins, it is preferred that an information message documenting the change of authentication module usage is transmitted to a remote network entity.

Thus, also on the side of the remote network entity, it can be registered that the RF communication device is now operated with a second authentication module, either alone or in addition to the first authentication module.

In a particular preferred embodiment, the second subscriber information comprises an information element indicating whether or not the second subscriber information shall be used with priority over the first subscriber information and, upon ascertaining that the validity criterion is fulfilled, the RF communication device is operated using the second authentication module without using the first authentication module.

For service purposes, it can also be advantageous that the second authentication module defines a highest priority authentication module. Upon detection that such highest priority authentication module is operatively connected to the RF communication device, it is automatically switched to the second authentication module if the validity criterion is fulfilled, but regardless of further information stored on the second authentication module.

According to a second aspect of the present invention, the above identified technical object is achieved by a RF communication device configured to operate using a first authentication module, which comprises a first processor and a first memory storing first subscriber information suitable for authenticating and identifying a subscriber on a first RF communication network, the RF communication device comprising:

a detector configured to detect an operative connection of the RF communication device to a connectable second authentication module, which comprises a second memory storing second subscriber information suitable for authenticating and identifying either the first or the second subscriber on either the first RF communication network or on a second RF communication network, a reading unit configured to read the second subscriber information from the second authentication module and a checking unit configured to ascertain whether the second subscriber information fulfills a predetermined validity criterion, wherein the RF communication device is configured to operate using the second authentication module either in addition to using the first authentication module or without using the first authentication module, if the validity criterion is fulfilled by the second subscriber information.

Principally, the RF communication device of the second aspect of the present invention shares the advantages of the operating method of the first aspect of the present invention. In particular, the RF communication device has preferred embodiments that correspond to embodiments of the operating method described above. For instance, in a preferred embodiment, the RF communication device comprises a comparison unit for comparing a first predetermined part of the first subscriber information with a second predetermined part of the second subscriber information. It is furthermore preferred that the RF communication device comprises a transmitter configured to transmit a request for checking fulfillment of the validity criterion via the first communication network to a remote network entity, the request including the first subscriber information and the second subscriber information read from the second authentication module and it is preferred that the RF communication device is configured for receiving a response from the remote network entity including information on fulfillment of the validity criterion from the remote network entity. It is also preferred that the RF communication device comprises a user interface configured to indicate which of the authentication modules is in use and/or for indicating if the validity criterion is fulfilled.

In correspondence to the operating method of the first aspect of the present invention and in correspondence to the RF communication device of the second aspect of the present invention, the above identified technical object is, according to a third aspect of the present invention, achieved by a method for operating an authentication server of a network entity of a RF communication network, the method comprising:

storing authentication information in an authentication memory of the authentication server, receiving an electronic change request signal sent by a RF communication device being operated by a method according to the first aspect of the present invention or by a RF communication device according to the second aspect of the present invention, the electronic change request signal including the first subscriber information and the second subscriber information, ascertaining whether the second subscriber information complies with the stored authentication information and causing transmission of an electronic validation response signal to the RF communication device in dependence of the ascertaining step.

According to a fourth aspect of the present invention, the above identified technical object is achieved by a first computer program for operating a RF communication device, the first computer program comprising program code means for causing the RF communication device to carry out the steps of the method of the first aspect of the present invention, when the first computer program is run on the computer controlling the RF communication device.

According to a fifth aspect, the above identified technical object is achieved by a second computer program for operating an authentication server of a RF communication network, the second computer program comprising program code means for causing the authentication server to carry out the steps of the method of the third aspect of the present invention, when the second computer program is run a computer controlling the authentication server.

The first and the second computer program of the fourth and the fifth aspect of the invention may each be stored/distributed on a suitable medium, such as an optical storage medium or a solid-state medium supplied together with or as part of other hardware, but may each also be distributed in other forms, such as via the Internet or other wired or wireless telecommunication systems.

BRIEF DESCRIPTION OF THE DRAWINGS

These and other aspects of the invention will be apparent from and elucidated with reference to the embodiments described hereinafter.

In the following drawings.

DESCRIPTION OF EMBODIMENTS

Figure 1:
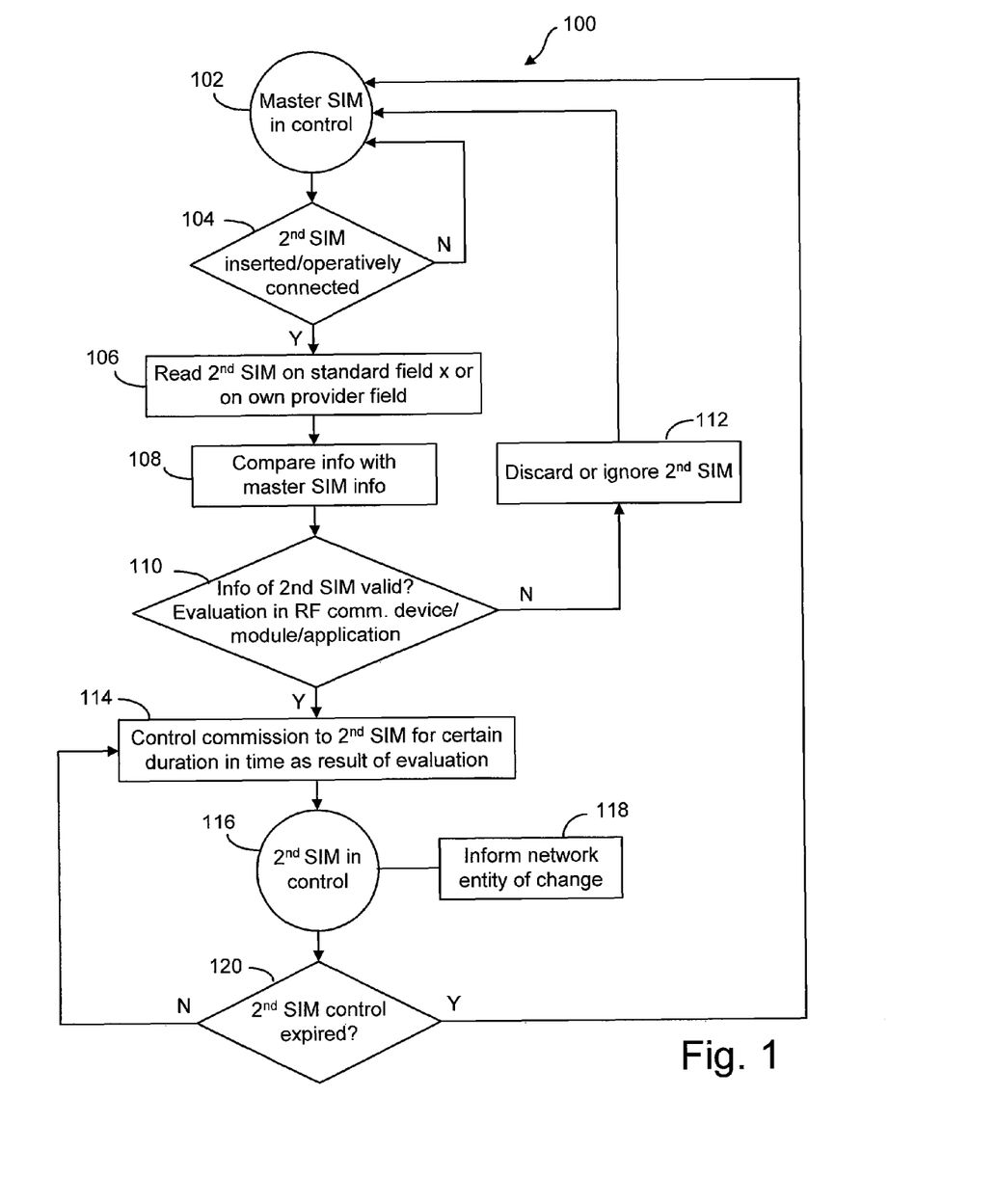
FIG. 1: shows exemplary a flow chart illustrating an embodiment of a method according to the first aspect of the invention.
Figure 2:
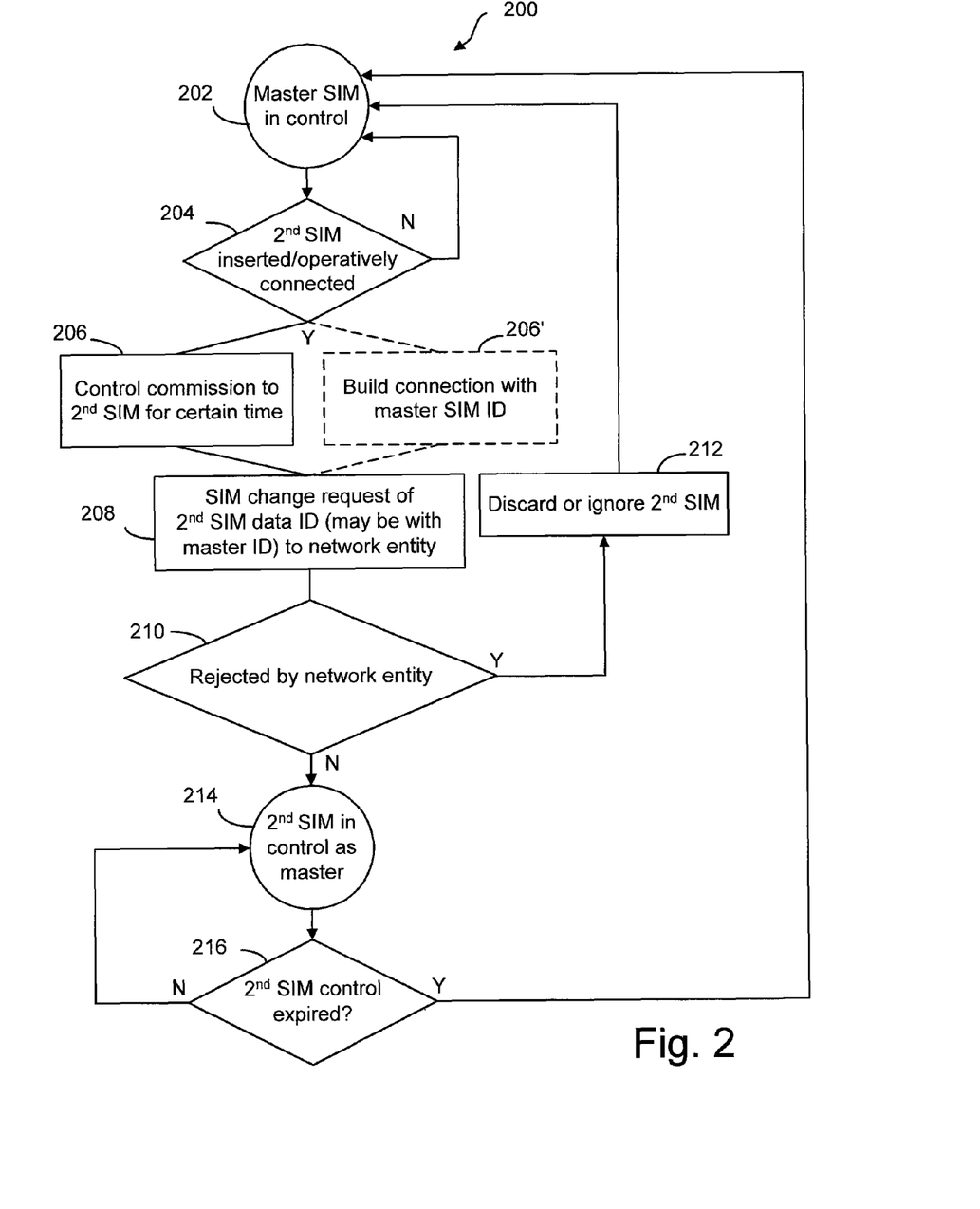
FIG. 2: shows exemplary a flow chart illustrating a second embodiment of a method according to the first aspect of the invention.
Figure 3:
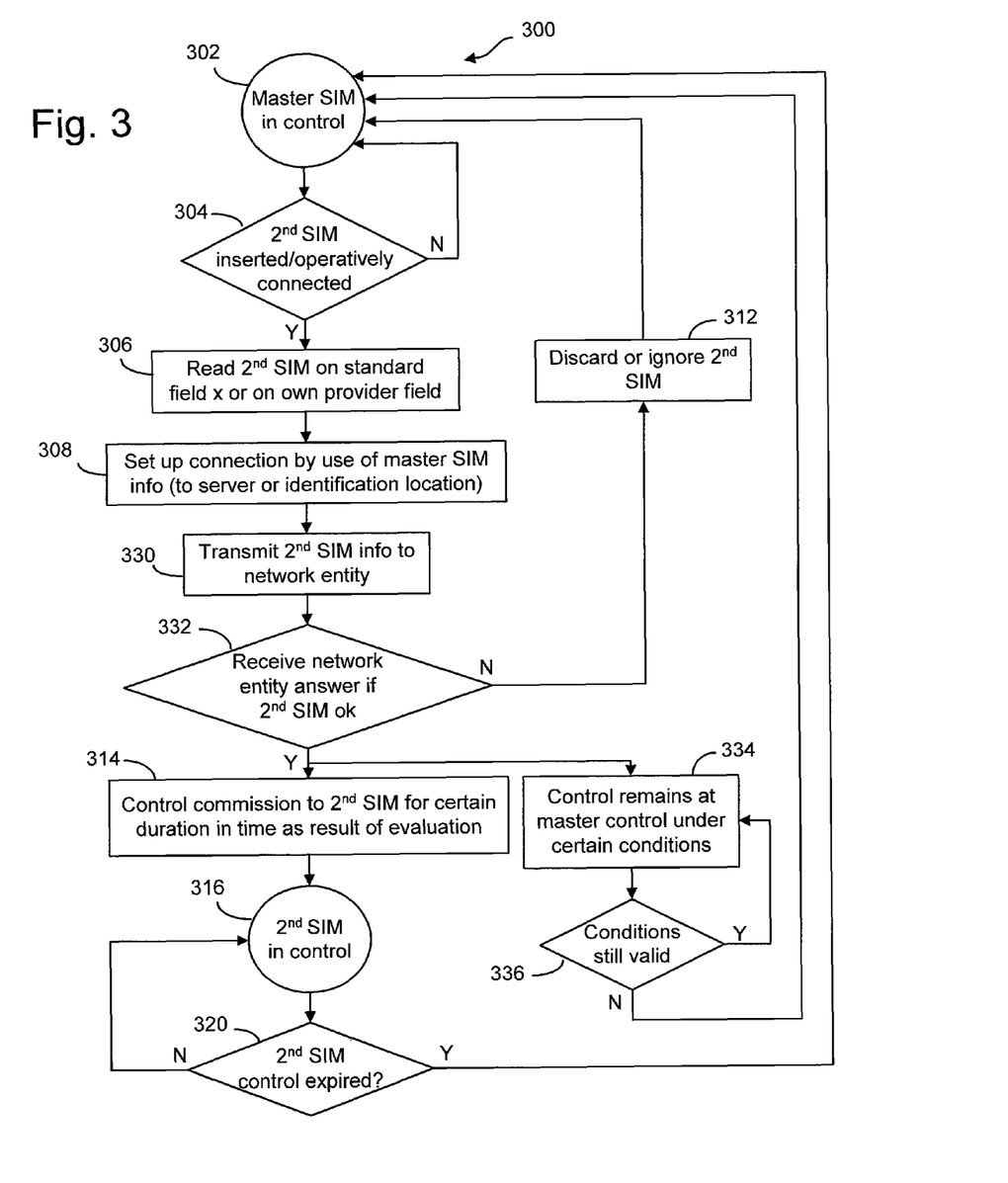
FIG. 3: shows exemplary a flow chart illustrating a third embodiment of a method of according to the first aspect of the invention.

FIGS. 1 to 3 show flow charts illustrating embodiments of a method for operating a RF communication device. The flow charts use circles to indicate states of the RF communication device during operation, rectangles to indicate an action performed in executing the method for operating the RF communication device, and diamonds to indicate decision points in the method for operating a RF communication device.

A method 100 depicted in FIG. 1 starts in a state 102, in which the RF communication device is operated using a first authentication module, which by way of example is in the following referred to as a master SIM. In other words, the master SIM is in control of the RF communication of the device with external network entities. However, it can be, as indicated above, any other kind of an authentication module. Same applies to the description of the embodiments according to FIG. 2 and FIG. 3.

In a subsequent decision point 104, the RF communication device checks whether a second authentication module, hereinafter referred to as a second SIM, is inserted into, or respectively, otherwise operatively connected to the RF communication device. It shall be understood that the second SIM can be a removable corporeally present module, but, as an alternative, also a virtually implemented authentication module defined on a server in a network. If the result of this monitoring step is "no" (N), the RF communication device remains in the state 102 and returns to the monitoring step 104 at a later point in time. For instance, the monitoring whether a second SIM is inserted into/operatively connected to the RF communication device may be performed at regular time intervals, which are predetermined.

On the other hand, if in this monitoring step 104 it is detected that a second SIM is inserted/operatively connected, subscriber information stored on the second SIM is read in a step 106 of the method. This information can be placed on a standard field or on a field defined by the provider.

In this case, the RF communication device checks in a subsequent step 108, whether the second subscriber information stored on the second SIM fulfills a predetermined validity criterion. In the present embodiment, the second subscriber information on the second SIM is compared with first subscriber information stored on the master SIM. Subsequently, in a step 110, an evaluation is performed, whether the second subscriber information on the second SIM does fulfill the validity criterion. The evaluation may be performed in the context of running an operating system of the RF communication device or in the context of executing an application program installed on the RF communication device.

If the evaluation in step 110 returns that the second subscriber information does not fulfill the predetermined validity criterion (N), the method of the present embodiment branches to a step 112, in which the second SIM is either discarded or ignored by the RF communication device, and operation continues in the previous state 102, in which the master SIM remains in control.

If, however, the validity criterion is found to be fulfilled in step 110 (Y), the method continues in a step 114 to commission control of the RF communication to the second SIM for a predetermined time duration. That is, the RF communication device changes into a state 116, in which the second SIM has control of the RF communication with external RF communication network entities. As an optional step, this change of state may be shared with a network entity run by a provider, as shown by step 118. The network entity is thus an apparatus that can be accessed wirelessly by the RF communication device and that can be involved in the validation process, for instance either actively by processing requests for a change of an authentication module or passively by simply registering a change of an authentication module. For instance, the network entity comprises an authentication server. Such a network entity can also be operated by an operator of a gas/water/electricity etc. grid that is used by a plurality of providers.

The RF communication device continues to check in a decision point 120 whether the control period assigned to the second SIM has expired. If this is not the case (N), the RF communication device remains in the state 116, i.e., the second SIM keeps control. If, on the other hand, the control period of the second SIM has indeed expired (Y), the RF communication device changes from the state 116 back into its original state 102, in which the master SIM is in control again. Also this change of state may be communicated to a network entity of a provider. However, this optional step is not shown in the flow diagram of FIG. 1.

Customer information stored on the master SIM may be used or, respectively, its copy, which can be encrypted, placed on the second SIM as authentication information for the second SIM. To be secure against misuse, the information on master SIM and/or on the second SIM may be encrypted by a special algorithm. Furthermore, the second SIM may also contain a special encrypted code which can only be decoded by using information of the master SIM. For instance, such information of the master SIM necessary for reading information from the second SIM can be a special string placed in the first memory of the master SIM.

The method 100 according to FIG. 1 can summarized as in the following table:

| Step | Action |
|------|--------|
| 102 | Master SIM in control |
| 104 | $2^{nd}$ SIM inserted/operatively connected |
| 106 | Read $2^{nd}$ SIM on standard field x or on own provider field |
| 108 | Compare info with master SIM info |
| 110 | Information of $2^{nd}$ SIM valid? Evaluation in the RF communication device/module/application |
| 112 | Discard or ignore $2^{nd}$ SIM |
| 114 | Control commission to $2^{nd}$ SIM for certain duration in time as result of evaluation |
| 116 | $2^{nd}$ SIM in control |
| 118 | Inform network entity of change |
| 120 | $2^{nd}$ SIM control expired? |

FIG. 2 shows a flow chart of a second embodiment for operating a RF communication device. The method starts from a state 202, in which the RF communication device is operated using a first authentication module, again referred to as a master SIM for the purpose of the present exemplary description. The master SIM stores first subscriber information suitable for authenticating and identifying a first subscriber on a first RF communication network. In a subsequent step 204, it is monitored whether a second authentication module, hereinafter again referred to as a second SIM, is inserted into/operatively connected to the RF communication device. The second SIM comprises a memory and stores second subscriber information, which is suitable for authentication and identifying either the same subscriber as that allocated to the master SIM, or a different subscriber, on either the same RF communication network as allocated to the master SIM or on a different RF communication network. Thus, steps 202 and 204 are identical to steps 102 and 104 of the previous embodiment of FIG. 1. Accordingly, if the monitoring of step 204 does not (N) indicate that a second SIM is inserted into/operatively connected to the RF communication device, the RF communication device remains in its state 202 and continues the monitoring process.

On the other hand, if the monitoring process detects a second SIM inserted into/operatively connected to the RF communication device (Y), the method proceeds with commissioning control over the RF communication processes to the second SIM for a predefined amount of time (step 206) or builds up a connection with a master SIM identification (step 206'). Concerning the first option (step 206), it is possible that the master SIM runs a logic which allows handing over the control for a predefined amount of time to the second SIM and reversing that process after the certain predefined amount of time of time autonomously. During the predefined amount of time, the second SIM is in control of the RF communication device.

In a following step 208, a change request regarding the active SIM is sent to a network entity. The change request is sent either in a state where the second SIM is in control (previous step: step 206) or in a state where the master SIM is in control (previous step: step 206').

The change request contains the authentication information, i.e. the second subscriber information stored in the memory of the second SIM. In one embodiment, the change request is additionally accompanied by additional data for authentication, namely subscriber information stored on the master SIM. The first and second subscriber information can each include a SIM identification (ID). The second SIM ID and the master SIM ID are used to distinguish the two SIMs from each other. The change request can be sent to the network entity by using only the second SIM ID (step 206) or by using both the second SIM ID and the master SIM ID (step 206'). The set-up of a connection may be based on a network entity address stored on the master SIM, such that accessing a wrong network entity is prevented and such that a secure connection to the network entity is ensured.

In a subsequent step, the acceptance or rejection of the change request is monitored by RF communication device in a step 210. If the change request is rejected (Y), the method branches to step 212, in which the second SIM is either discarded or ignored by the RF communication device, and the RF communication device remains in its original state 202. If, however, the change request is accepted by the provider (N), the state is changed and the second SIM is used for RF communication by the RF communication device (state 214). In this case, the predefined duration of the state 214 is monitored in a step 216, and the RF communication device returns into its original state 202, as soon as the control period assigned to the second SIM has expired (Y).

The network entity receiving the change request can comprise an authentication server hosting/nesting relevant information. That server may be operated by the goods (for instance water, gas, electricity) distributer, i.e. the operator operating the corresponding network, for instance the operator of the electric grid. This is of particular interest for so called "Prepaid" solutions: A costumer can buy a Prepaid SIM card with a certain amount of goods from a provider. The Prepaid SIM could have credit concerning a certain amount of data volume for download, a certain amount of Kilowatt-hours, a certain amount of water/gas etc. This card is then placed into the module as the second SIM. The information read out from that SIM, for instance including a special code printed on the Prepaid SIM card and identification of the Prepaid SIM, is validated in a database of the server of the operator, where Prepaid cards are handled. That database may be operated by the operator of a respective grid/network (mobile radio/gas/water/electricity). This database may also make us of other databases, for instance of a database of a respective provider of the goods.

In case that the card is successfully validated, the agreed amount of goods encoded in the Prepaid SIM can be delivered to the customer accordingly (step 214). After a corresponding time period, the master SIM, which can be an initial/original provider SIM, resumes its activity. For instance, a provider could offer electricity for a reduced price in the form of a Prepaid SIM card insertable in a metering application. Due to the facilitated validation process, a customer can accept this offer by merely buying the Prepaid Card and inserting it into his metering application. Thus, the customer can easily take advantage of timely limited special offers of other providers than his standard provider.

The method 200 according to FIG. 2 can be summarized as in the following table:

| Step | Action |
|------|--------|
| 202 | Master SIM in control |
| 204 | $2^{nd}$ SIM inserted/operatively connected |
| 206 | Control commission to $2^{nd}$ SIM for certain time |
| 206' | Build connection with master SIM ID |
| 208 | SIM change request of $2^{nd}$ SIM data ID (may be with master ID) to network entity |
| 210 | Rejected by network entity? |
| 212 | Discard or ignore $2^{nd}$ SIM |
| 214 | $2^{nd}$ SIM in control as master |
| 216 | $2^{nd}$ SIM control expired? |

FIG. 3 exemplary shows a flow chart illustrating a third embodiment of the method in accordance with the first aspect of the present invention. Steps/actions 302, 304 and 306 correspond to steps/actions 102, 104 or, respectively, to 106. In step 308, a connection is set up by use of the master SIM information, for instance to an authentication server of a network entity or an identification location. An identification location can be an entity hosting relevant information for a related decision process.

In step 330, the information of the second SIM is transmitted to the network entity. The network entity processes the transmitted information and response with a corresponding answer informing the RF communication device, whether or not the second SIM is ok. If not (N), the $2^{nd}$ SIM is either discarded or ignored (312). If the $2^{nd}$ SIM is ok (Y), the method 300 branches into options 314, 334. In the first branch 314, control of the RF communication device is commissioned to the $2^{nd}$ SIM for a certain duration and time as a result of an evaluation. Referring to the example of the second SIM being a Prepaid Card introduced above, the evaluation could, for instance, comprise determining, if an amount of goods (gas, water, electricity, data volume) has been entirely used up or if there is a still credit available according to the Prepaid Card. The information related to remaining credit can either be stored on the second SIM itself or in a server of the network entity.

As a result (316), the $2^{nd}$ SIM is in control and stays there as long as the control time has not expired (320). Again, control expiration can ensue due an elapse of a predetermined duration or can be signalized by the provider. If the control has expired (Y), the method resumes state 302. In the other case (N), the $2^{nd}$ SIM stays in control (316).

In the other branch 334, after reception of the network entity answer 332, control of the RF device remains at the master SIM control, wherein some contract specifications of the second SIM, for instanced related to a fee of a goods unit, are transferred to the master SIM for a limited amount of time. The method remains at this state 334, as long as such contract specifications are valid. For instance, turning back to the example of the second SIM being a Prepaid Card, the method 300 remains at state 334, as long as the credit specified on the second SIM is not used up and returns to state 302, if the credit is used up.

In step 336, it is checked whether the certain conditions are still valid. If yes (Y), control of the RF communication device remains at the original master control (334). In the other case (N), the method 300 resumes state 302.

The method 300 according to FIG. 3 can be summarized as in the following table:

| Step | Action |
| --- | --- |
| 302 | Master SIM in control |
| 304 | $2^{nd}$ SIM inserted/operatively connected |
| 306 | Read $2^{nd}$ SIM information on standard field x or on provider field |
| 308 | Setup connection by use of master SIM info (to server or identification location) |
| 312 | Discard or ignore $2^{nd}$ SIM |
| 314 | Control commission to $2^{nd}$ SIM for a certain duration in time as a result of evaluation |
| 316 | $2^{nd}$ SIM in control |
| 320 | $2^{nd}$ SIM control expired? |
| 330 | Transmit $2^{nd}$ SIM info to network entity |
| 332 | Receive network entity answer if $2^{nd}$ SIM ok |
| 334 | Control remains at master control under certain conditions |
| 336 | Conditions still valid? |

The description of the embodiments 100, 200 and 300 of the method according to the first aspect of the present invention has made clear that the decision about the validity can either be made on the side of the RF communication device or on the side of the RF communication network entity that is remotely arranged.

Figure 4:
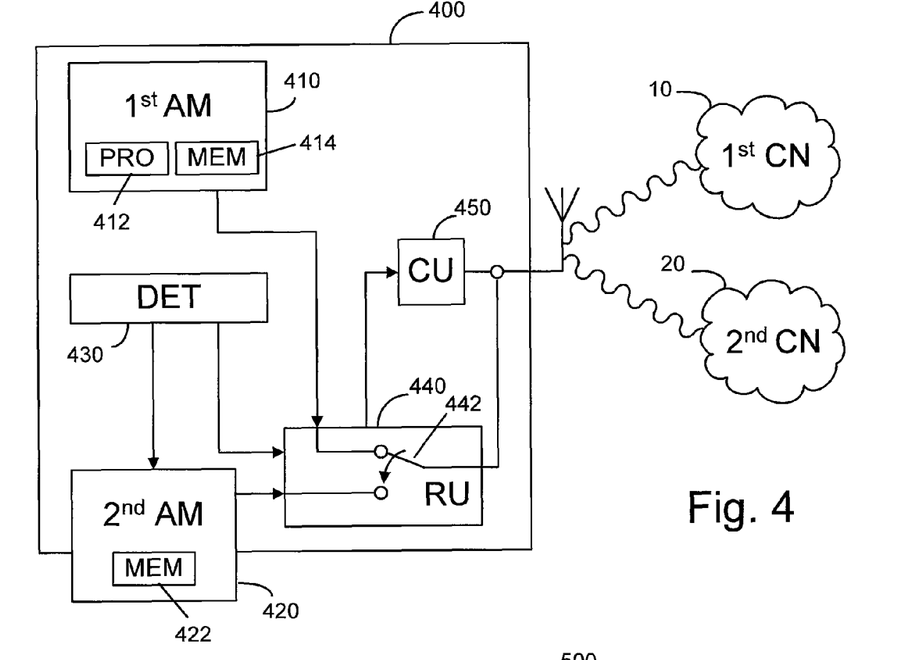
FIG. 4: shows schematically and exemplary a representation of a RF communication device in accordance with the second aspect of the invention

FIG. 4 shows exemplary and schematically an embodiment 400 of the RF communication device according to the second aspect of the present invention. The RF communication device 400 is configured to operate using a first authentication module 410 ($1^{st}$ AM), which comprises a first processor 412 and the first memory 414 storing first subscriber information suitable for authenticating and identifying first subscriber on the first RF communication network 10. For connecting to the first RF communication network 10 or to another RF communication network, the RF communication device 400 comprises transmission means for building up such connection, for instance an antenna 412.

The RF communication device 400 is adapted to detect an operative connection to a second authentication module 420 ($2^{nd}$ AM), to ascertain validity of the second authentication module 420 and to use the second authentication module 420 after ascertaining the validity. Therefore, the RF communication device 400, which can be, for instance, a metering application for measuring gas/water/electricity consumption, can continuously operate even if a change of an authentication module is necessary.

The RF communication device 400 comprises a detector 430 (DET) that detects an operative connection of the RF communication device 400 to a connectable second authentication module 420, which comprises a second memory 422 storing second subscriber information suitable for authenticating and identifying either the first or the second subscriber on either the first RF communication network 10 or on a second RF communication network 20. The drawing according to FIG. 4 is not meant to suggest that the second authentication module 420 must be corporeally present, such as in the form of a SIM, and physically connected to the RF communication device. This is only one option.

As another option, the second authentication module 420 can be implemented virtually, for instance by a software module running on a server that is connectable via a communication network (not shown) and that can be accessed by the RF communication device 400. In this case, the RF communication device 400 comprises an interface (not shown) for establishing such operative remote network connection to the virtually implemented authentication module 420.

The RF communication device 400 furthermore comprises a reading unit 440 (RU) that reads the second subscriber information from the second authentication module 420 and a checking unit 450 (CU) that ascertains whether the second subscriber information fulfills a predetermined validity criterion. For ascertaining, the checking unit 450 can, for instance, comprise a comparison unit that compares a first predetermined part of first subscriber information with a second predetermined part of the second subscriber information.

In an example, the first subscriber information stored on the first memory of the first authentication module 410 is divided into changeable first information, such as name, address, contacts, and other private fields, and rates/tariffs, and into non-changeable first information, such as an identifier of the RF communication device 400, e.g., an International Mobile Station Equipment Identity (IMEI). The RF communication device 400 accesses the second authentication module 420 through a network connection and validates the second authentication module 420. After successful validation, the RF communication device 400 can operate using the second authentication module 420 in addition to using the first authentication module 410, e.g., by updating the changeable first information according to the read and validated second subscriber information. In this sense, the RF communication device 400 can operate with an updated first authentication module that has been updated with second subscriber information of a second virtually implemented authentication module.

Generally, the RF communication device 400 can operate using the second authentication module 420 either in addition to using the first authentication module 410 or without using the first authentication module 410, if the validity criterion is fulfilled by the second subscriber information. This is schematically indicated by a switch 442 arranged in the reading unit 440. In dependence of the outcome of the validity check, the RF communication device 400 builds up connection to the first/second RF communication network 10/20 using first subscriber information of the first authentication module 410 and/or second subscriber information of the second authentication module 420.

The checking unit 450 can also build up a connection to a remote network entity (not shown) for ascertaining, whether the second subscriber information fulfills the predetermined validity criterion. For instance the checking unit 450 sends a request for checking fulfillment of the validity criterion via the first RF communication network 10 to the remote network entity, the request including the first subscriber information and the second subscriber information read from the second authentication module 420. The network entity checks the request and provides a response. The checking unit 450 receives that response from the remote network entity, the response including information on fulfillment of the validity criterion from the remote network entity.

Figure 5:
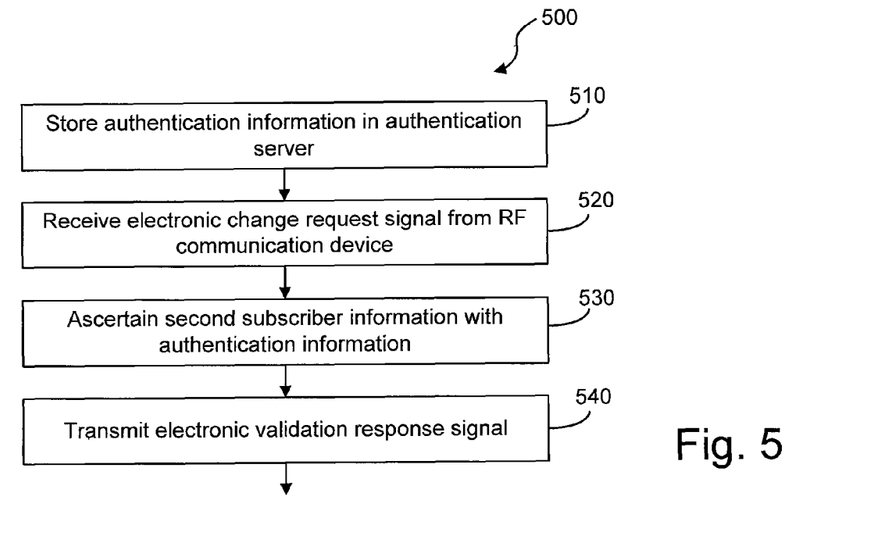
FIG. 5: shows exemplary a flow chart illustrating an embodiment of a method according to the third aspect of the invention.

FIG. 5 exemplary shows a flow chart illustrating and embodiment 500 of the method according to the third aspect of the present invention. The method 500 is a method for operating an authentication server of a network entity of a RF communication network.

In a first step 510, authentication information is stored in an authentication memory of the authentication server. In a second step 520, an electronic change request signal is received that is sent by a RF communication device that is being operated by a method according to the first aspect of the present invention or by a RF communication device according to the second aspect of the present invention. The electronic change request signal includes the second subscriber information.

In a third step 530, it is ascertained whether the second subscriber information complies with the stored authentication information. In the last step 540, transmission of an electronic validation response signal to the RF communication device is caused independence of the ascertaining step 530.

The method 500 thus constitutes an operating method for a network entity that cooperates with a RF communication device according to the second aspect of the present invention, or respectively, with a RF communication device that is operated according to a method of the first aspect of the present invention, in particular with the method 200 or 300 depicted in FIG. 2 and in FIG. 3.

In summary, the present invention relates to a method for operating a RF communication device, a RF communication device 400, a method for operating an authentication server of a network entity and to corresponding computer programs. All aspects of the present invention take into account that a continuous operation of a RF communication device, in particular of a metering application, needs to be ensured, even if a component SIM or initial SIM has to be replaced or supplemented by an external new SIM.

It is suggested to ascertain the validity of the external SIM by using information stored in the component/initial SIM. The validity of the external SIM can be ascertaining either solely on the side of the RF communication device or by sending a corresponding validity check request signal to a remote network entity. Such remote network entity comprises an authentication server storing authentication information in an authentication memory and checks, upon reception of such validity check request signal, whether subscriber information stored on the external SIM complies with the stored authentication information. Accordingly, a corresponding response signal is sent back to the RF communication device, allowing the RF communication device to ascertain the validity of the external SIM and commission control to the external SIM afterwards.

What is claimed is:

1. A method for operating a RF communication device, comprising
    operating the RF communication device using a first authentication module, which comprises a first processor and a first memory storing first subscriber information suitable for authenticating and identifying a first subscriber on a first RF communication network,
    detecting an operative connection of the RF communication device to a connectable second authentication module, which comprises a second memory storing second subscriber information suitable for authenticating and identifying either the first or the second subscriber on either the first RF communication network or on a second RF communication network,
    reading the second subscriber information from the second authentication module,
    ascertaining whether the second subscriber information fulfills a predetermined validity criterion
    if the validity criterion is fulfilled by the second subscriber information, operating the RF communication device using the second authentication module either in addition to using the first authentication module or without using the first authentication module and
    if the validity criterion is not fulfilled by the second subscriber information, continuing operation of the RF communication device using the first authentication module.

2. The method of claim 1, wherein ascertaining whether the second subscriber information stored on the second authentication module fulfills the predetermined validity criterion is performed by executing, either on the first processor or on a third processor arranged in the RF communication device, a first executable code.

3. The method of claim 1, wherein ascertaining whether the second subscriber information stored on the second authentication module fulfills the predetermined validity criterion comprises comparing a first predetermined part of the first subscriber information stored on the first subscriber authentication module with a second predetermined part of the second subscriber information read from the second authentication module.

4. The method of claim 1, wherein ascertaining whether the information stored on the second authentication module fulfills the predetermined validity criterion is performed by
    sending a request for checking fulfillment of the validity criterion via the first RF communication network to a remote network entity, the request including the first subscriber information and the second subscriber information read from the second authentication module and receiving a response from the remote network entity including information on fulfillment of the validity criterion from the remote network entity.

5. The method of claim 1, wherein ascertaining whether the second subscriber information stored on the second authentication module fulfills the predetermined validity criterion comprises identifying a validity information element stored in the second memory of the second authentication module.

6. The method of claim 1, wherein reading the second subscriber information stored on the second authentication module is performed by either the third processor of the RF communication device or by the first processor of the first authentication module, executing a second executable code.

7. The method of claim 1, wherein operating the RF communication device using the second authentication module is performed with a time limit, and wherein the RF communication is operated using the first authentication module again after the time limit has elapsed.

8. The method of claim 1, comprising, if the validity criterion is not fulfilled by the second subscriber information, sending a message to the remote network entity, the message including information about invalidity of the second subscriber information according to the predetermined validity criterion.

9. The method of claim 1, comprising, if the validity criterion is not fulfilled by the second subscriber information, generating, at a user interface of the RF communication device, an output indicating invalidity of the second subscriber information according to the predetermined validity criterion.

10. The method of claim 1, wherein upon beginning operation of the RF communication device using the second authentication module an information message documenting the change of authentication module usage is transmitted to a remote network entity.

11. The method of claim 1, wherein the second subscriber information comprises an information element indicating whether or not the second subscriber information shall be used with priority over the first subscriber information, and wherein, upon ascertaining that the validity criterion is fulfilled, the RF communication device is operated using the second authentication module without using the first authentication module.

12. A RF communication device configured to operate using a first authentication module, which comprises a first processor and a first memory storing first subscriber information suitable for authenticating and identifying a first subscriber on a first RF communication network, the RF communication device comprising:

a detector configured to detect an operative connection of the RF communication device to a connectable second authentication module, which comprises a second memory storing second subscriber information suitable for authenticating and identifying either the first or the second subscriber on either the first RF communication network or on a second RF communication network, a reading unit configured to read the second subscriber information from the second authentication module and a checking unit configured to ascertain whether the second subscriber information fulfills a predetermined validity criterion, wherein the RF communication device is configured to operate using the second authentication module either in addition to using the first authentication module or without using the first authentication module, if the validity criterion is fulfilled by the second subscriber information, and if the validity criterion is not fulfilled by the second subscriber information, continuing operation of the RF communication device using the first authentication module.

13. At least one memory configured to store a computer program for operating a RF communication device, the computer program comprising program code means for causing the RF communication device to carry out the steps of the method as defined in claim 1, when the computer program is run on a computer controlling the RF communication device.

14. A method for operating an authentication server of a network entity of a RF communication network, the method comprising:

storing authentication information in an authentication memory of the authentication server, receiving an electronic change request signal sent by a RF communication device being operated by a method according to claim 1, the electronic change request signal including the second subscriber information, ascertaining whether the second subscriber information complies with the stored authentication information and causing transmission of an electronic validation response signal to the RF communication device in dependence of the ascertaining step.

15. At least one memory configured to store a computer program for operating an authentication server of a RF communication network, the computer program comprising program code means for causing the authentication server to carry out the steps of the method as defined in claim 14, when the computer program is run on a computer controlling the authentication server.

\* \* \* \* \*